(12) United States Patent
Paek et al.

(10) Patent No.: US 7,283,705 B2
(45) Date of Patent: Oct. 16, 2007

(54) PLANAR FOCUSING GRATING COUPLER

(75) Inventors: Mun Cheol Paek, Daejeon-Shi (KR); Yeung Joon Sohn, Daejeon-Shi (KR); Dong Woo Suh, Daejeon-Shi (KR); Ho Jun Ryu, Seoul (KR); Hyeon Bong Pyo, Daejeon-Shi (KR); Yong Woo Park, Daejeon-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 208 days.

(21) Appl. No.: 10/913,417

(22) Filed: Aug. 9, 2004

(65) Prior Publication Data

US 2005/0141812 A1 Jun. 30, 2005

(30) Foreign Application Priority Data

Dec. 26, 2003 (KR) .................. 10-2003-0097063

(51) Int. Cl.
*G02B 6/34* (2006.01)
*G02B 6/00* (2006.01)

(52) U.S. Cl. ........................................ 385/37; 385/130
(58) Field of Classification Search ................. 385/37, 385/8, 130
See application file for complete search history.

(56) References Cited

U.S. PATENT DOCUMENTS

| | | | |
|---|---|---|---|
| 4,779,259 A | | 10/1988 | Kono et al. |
| 4,801,184 A | * | 1/1989 | Revelli .......................... 385/8 |
| 4,830,447 A | * | 5/1989 | Kamiyama et al. ......... 385/130 |
| 5,657,407 A | * | 8/1997 | Li et al. ....................... 385/37 |
| 5,677,970 A | * | 10/1997 | Nashimoto .................... 385/7 |
| 6,285,813 B1 | * | 9/2001 | Schultz et al. ............... 385/37 |
| 2005/0121415 A1 | * | 6/2005 | Paek et al. .................... 216/41 |

OTHER PUBLICATIONS

Suhara et al., "Focusing Grating Coupler in AlGaAs Optical Waveguide" Aug. 1992, IEEE Photonics Technology Letters, vol. 4, No. 8., p. 903-905.*
Paek et al., "High NA focusing grating coupler for blu-ray disc", Technical Digest, Nov. 3-7, 2003.
Ura et al., "An Integrated-Optic Disk Pickup Device", Journal of Lightwace Technology, Jul. 1986, pp. 913-918.
Sheard et al., "Focusing waveguide grating coupler using a diffractive doublet", Applied Optics, Jul. 1997, pp. 4349-4354.

* cited by examiner

*Primary Examiner*—Sung Pak
(74) *Attorney, Agent, or Firm*—Mayer Brown Rowe & Maw LLP

(57) ABSTRACT

Provided is a planar focusing grating coupler, comprising: a light waveguide including a cladding layer and a core layer formed on a substrate and maintaining incident laser light in a single mode; and a focusing grating coupler formed to have a predetermined grating pitch at a certain area over the core layer, wherein the light using to the light waveguide forms a focal point with the grating layer in the direction perpendicular to the focusing grating coupler, whereby an ultra small pickup head for a mobile optical disk can be used.

20 Claims, 5 Drawing Sheets

$$\text{Minimum spacing} = \frac{\lambda}{N_{\textit{eff}} + N.A}$$

$$\text{Maximum spacing} = \frac{\lambda}{N_{\textit{eff}} - N.A}$$

$\lambda = 400nm$, $N_{\textit{eff}} = 1.4627$

| N.A. | Focal length | Spot size(1/e²) | Min. period |
|------|--------------|-----------------|-------------|
| 0.48 | 913.8 μm | 830nm | 205.9nm |
| 0.60 | 666.7 μm | 680nm | 193.9nm |
| 0.85 | 309.9 μm | 470nm | 173.1nm |

40

PLANAR FOCUSING GRATING COUPLER

BACKGROUND

1. Field of the Invention

The present invention relates to a planar light waveguide that maintains a single mode of an incident laser light source for obtaining a small spot size with a short wavelength laser and to a planar focusing grating coupler that uses a fine diffraction grating for focusing with the high numerical aperture.

2. Discussion of Related Art

A pickup head, which is an integral device of an optical disk drive well known as a CD, DVD and BD, comprises optical parts such as an optical lens and an optical isolator, and a lot of other parts such as a laser diode, a photodiode, and a focusing/tracking servo device, so that what is worst is that it is bulkier and heavier than a magnetic disk drive head known as a hard disk.

Accordingly, it serves as a drawback in terms of an access rate and a data transfer rate, etc. Recently, an ultra small type optical disk drive is researched and developed as a mass storage for applying to mobile/portable information appliances, and a technology is required that allows the foregoing drawbacks to be drastically improved.

One such method suggested is to use a focusing grating coupler with a fine optical grating rather than a substance lens, which allows significantly reducing a size and lowering a weight. The focusing grating coupler is a device fabricated on a plane, with an ultra fine grating that is finer than a light wavelength rather than with a spherical lens made of glass and plastic, and focuses incident light onto one point, with which the integral portion of the pickup head can be reduced below a semiconductor chip size, and accordingly, the access rate and the data transfer rate can also be significantly improved.

In this case, in order to increase record density while replacing the substance lens with the planar focusing grating coupler, the minimum spot size of the laser light should be sufficiently small, in which the spot size has a relation as shown in the following equation (1).

$$\text{spot size} = 0.61 \frac{\lambda}{n \cdot NA} \quad (1)$$

where $\lambda$ indicates incident light, n indicates a refractive index of a medium, NA indicates a numerical aperture of a lens and is shown as $n \sin\theta$ in terms of an aperture angle $\theta$.

Therefore, in order to achieve the minimum spot size, generally, a shorter wavelength laser as an incident light source, and/or the higher numerical aperture (NA) of the lens should be used. For this, a short focal length and a large lens size, that is, a coupling area of the grating, should be increased or a coupling angle should be increased, in order to increase the numerical aperture NA while using laser with a short wavelength as possible.

SUMMARY OF THE INVENTION

The present invention is directed to a planar focusing grating coupler that implements a high numerical aperture, as a technology of fabricating a focusing grating coupler as large as a semiconductor chip size, in order to achieve an ultra lightweight, high performance, and an ultra small size of the substance lens that is an integral parts of a small form factor optical pickup.

It is also directed to the design and fabrication of a high-performance focusing grating coupler whose numerical aperture is above 0.85, using an ultraviolet and blue laser below 405 nm capable of applying to a BD and a next generation optical disk drive that is recently under research and developed.

One aspect of the present invention is to provide a planar focusing grating coupler comprising: a light waveguide including a cladding layer and a core layer formed on a substrate, and maintaining incident laser light in a single mode; and a focusing grating coupler formed to have a predetermined grating space at a certain area over the core layer, wherein the light incident into the light waveguide forms a focal point using the grating layer in a direction perpendicular to the focusing grating coupler.

"A direction perpendicular to a focusing grating coupler" can be appreciated as a total volume inside an area that enlarges the area that the focusing grating coupler occupies in the upper vertical direction, and a focal point is contained in the volume. More preferably, the focal point is on the center of the area that the focusing grating coupler occupies.

Such focusing grating coupler can be applied to light having a wavelength less than 400 nm, and preferably, a grating pitch can be adjusted between 350 to 50 nm.

Meanwhile, the space of the grating layer uses a phase match diagram to change each grating space, so that a coupling angle for each grating can face a center of the lens.

Preferably, as a change ratio of the grating pitch, a numerical aperture is determined with the minimum coupling angle and the maximum coupling angle, and is made more than 0.6.

DETAILED DESCRIPTION OF PREFERRED EMBODIMENTS

An embodiment of the present invention will now be described in detail with reference to the accompanying drawings. However, the embodiments of the present invention can be modified in a variety of forms, and should not be construed limitative hereto. The embodiments of the present invention are provided for more fully interpretation to those skilled in the art.

(Light Waveguide)

Figure 1A:
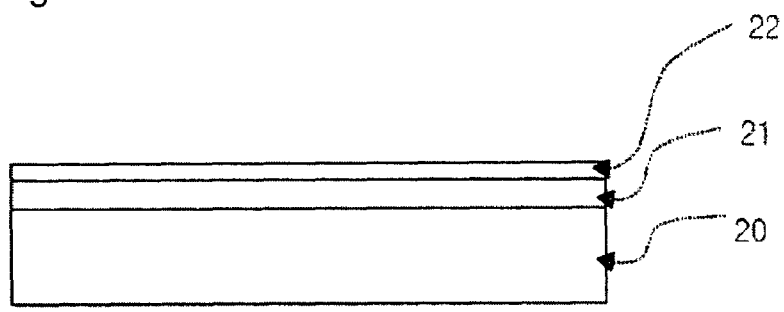
FIGS. 1A to 1C are diagrams illustrating a process of forming a light waveguide according to an embodiment of the present invention.
Figure 1B:
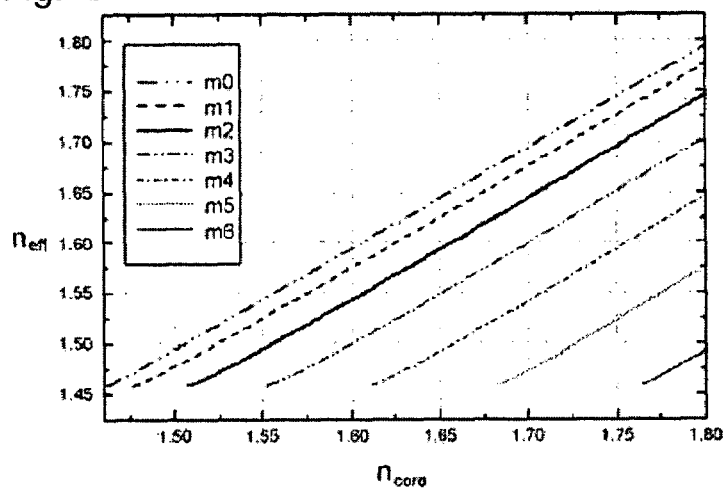
Figure 1C:
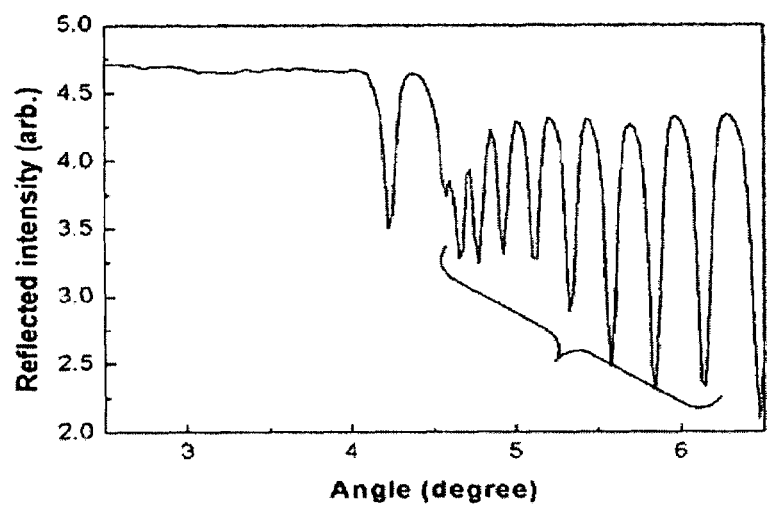

FIGS. 1A to 1C are diagrams showing a process of forming a light waveguide according to an embodiment of the present invention.

In FIG. 1A, a cladding layer 21 is deposited on a substrate 20, and then a core layer 22 is deposited to form a light waveguide layer. Here, the cladding layer 21 should have slightly lower refractive index than the core layer 22, whose difference gives a great impact on forming a single mode of the laser. Further, in order to keep a laser light source in a single mode, the difference of the refractive index between the core layer 22 and the cladding layer 21 in the light waveguide is desirable to be under 0.2%.

Taking an example of fabricating the light waveguide, the cladding layer 21 of a silicon oxide layer with a refractive index of 1.4714 is formed to a thickness of about 5.09 μm on the silicon substrate 20. Over the cladding layer 21, a boron-silicate glass (BPSG) core layer 22 with a refractive index of 1.4784 is formed to a thickness of about 2.01 μm. Meanwhile, the focusing grating coupler formed over the core layer 22 can be formed by patterning a silicon nitride layer in a predetermined space.

FIG. 1B is a theoretically calculated graph showing a change of an optical mode depending on a refractive index of the cladding layer to an effective refractive index of the core layer. As shown in FIG. 1B, a range meeting a condition of the single mode, or m=1, can be obtained. A thickness of the core layer becomes a critical condition for keeping a single mode. Preferably, a difference of the refractive indexes between the core layer and the cladding layer in the light waveguide is controlled under 0.2%.

Figures 2A, 2B:
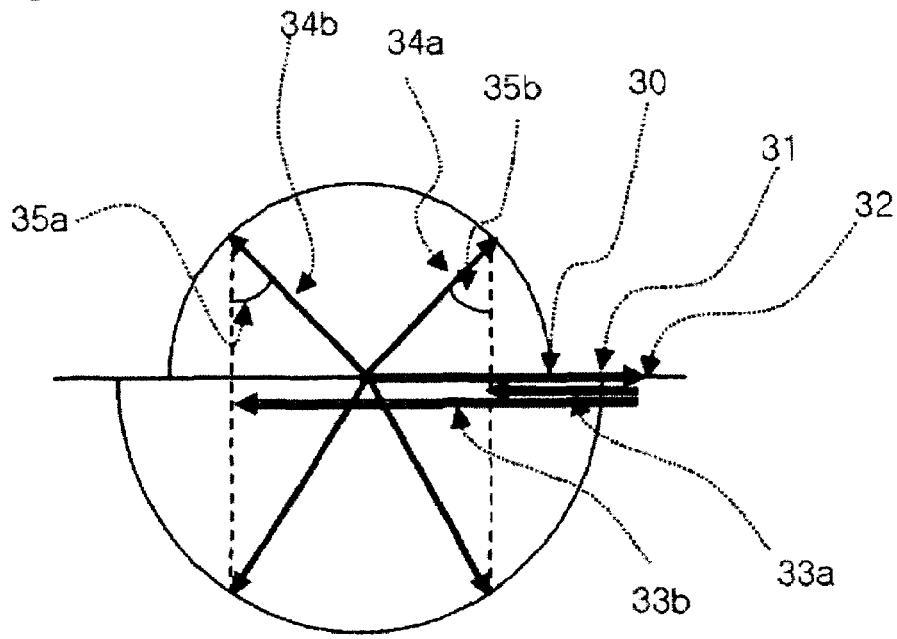
FIGS. 2A to 2C are diagrams illustrating a process of fabricating a focusing grating coupler over a light waveguide in turn.

FIG. 1C is a result actually measured using a prism coupler in order to check a laser single mode of the actually fabricated light waveguide of FIG. 2a. From this result, it can be seen that there are formed a single mode 23 for the core layer and a mixed mode 24 for the cladding layer.

(Design and Fabrication of Focusing Grating Coupler)

Figure 2C:
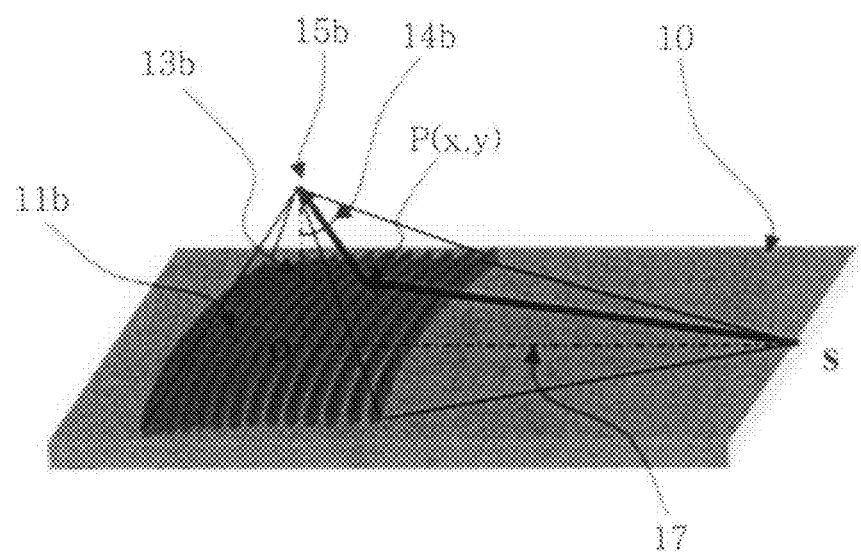

FIGS. 2A to 2C are diagrams showing a process of fabricating a focusing grating coupler on the light waveguide in turn.

FIG. 2A shows a phase match diagram used to design the focusing grating coupler according to an embodiment of the present invention. In FIG. 2A, each vector indicates a cladding layer wave vector 31:$n_s k$, a core layer wave vector (effective wavelength vector) 32:$N_{eff} k$, and air layer wave vector 30:$n_c k$, a minimum grating vector 33a;$K_{min}$, a maximum grating vector 33b:$K_{max}$, a minimum coupling angle wave vector 34a, a maximum coupling angle wave vector 34b, a maximum coupling angle $\theta_{max}$:35a, and a minimum coupling angle $\theta_{min}=-\theta_{max}$. Further, $n_s$ indicates a refractive index of the cladding layer, $n_f$ indicates a refractive index of the core layer, $n_c$ is a refractive index of the air layer, and k is a laser wave vector where k=$2\pi/\lambda$, and K is a grating vector 33, 34 and when the grating pitch is $\Lambda$, K=$2\pi/\Lambda$.

It will be appreciated that a coupling angle between laser light and a grating is changed according to the size of the grating vector K, and to act as a focusing grating coupler, each grating space should be uniformly changed, and the coupled laser light should be reached to a certain position, that is, the focal point.

Here, when the focal point is placed on a center of vertically top portion of the focusing grating coupler, a numerical aperture can be maximized. In this case, the numerical aperture NA is represented as $n_c \sin \theta$ in terms of the maximum coupling angle θ37. Therefore, as the θ is closer to 90 degrees, the numerical aperture NA becomes larger. Preferably, the focal point is configured to allow the area that the focusing grating coupler occupies to be within the area enlarged in the upper vertical direction. As described above, it is most preferable that the focal point is placed on the center of upper vertical direction.

The focal length f has a relation as shown in the following equation 2 in terms of the numerical aperture NA.

$$f = \frac{L}{2}\sqrt{\left(\frac{1}{NA^2}\right)-1} \quad (2)$$

where L is a length of one side of a rectangular focusing grating coupler.

FIG. 2B is an expression showing a process of calculating the minimum grating pitch and the maximum grating pitch, and the focal point after determining the numerical aperture of the focusing grating coupler. With 1.4627 Neff and 400 nm wavelength, a focal length, a spot size and a minimum grating pitch are listed depending on the numerical aperture NA. Based on this, with the numerical aperture NA 0.85 of the blue-ray disc (BD) and the numerical aperture NA 0.6 of the DVD, the minimum grating pitch and the maximum grating pitch can be obtained. Therefore, with this method, the grating pitch with which the numerical aperture NA of the lens can be above 0.85, the minimum pitch, and the maximum pitch are determined, and a grating shape can be designed to place the focal point at a vertically top portion of the focusing grating coupler.

As a result, the minimum grating pitch for achieving a high numerical aperture NA should be fabricated to reach around ¼ incident wavelength, and up to below 100 nm for a blue laser. To fabricate this semiconductor, a process technology of forming an ultra fine pattern is required. Preferably, in order to apply to the blue laser, the grating pitch is adjusted between 350 to 50 nm.

Figure 2D:
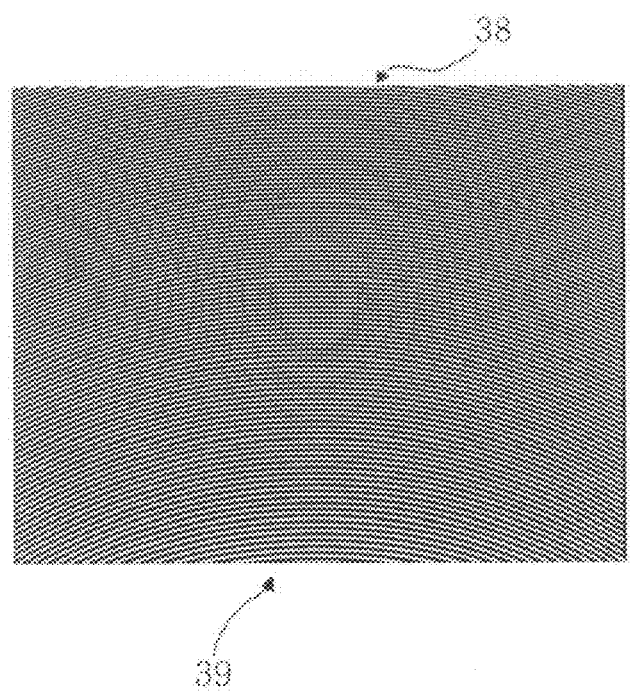
FIG. 2D is a diagram illustrating a grating space of an actually designed focusing grating coupler according to an embodiment of the present invention.

FIG. 2C illustrates a process of determining a curvature of the grating, wherein a path difference Δ with any point P(x,y) is calculated, a grating is configured in a position where the calculated value corresponds to the integer multiples of the wavelength in the context of light leaving a laser diode S, passing a center O of the focusing grating coupler and reaching a focal point 15b. The following equation 3 indicates this relation.

$$\Delta=[N_{eff}\sqrt{x^2+(y+r)^2}+\sqrt{x^2+y^2+f^2}-N_{eff}r-f]= \\ m\lambda(m=0,\pm1\pm2\ldots) \quad (3)$$

where Neff is an effective refractive index of the light waveguide layer, r is a distance 17 between an origin of the laser diode and a center of the focusing grating coupler, f is a focal length 13b, and the locus of the point P is shown in (x,y) coordinates. FIG. 2D shows the actual focusing grating coupler pattern fabricated with this method.

Figure 3:
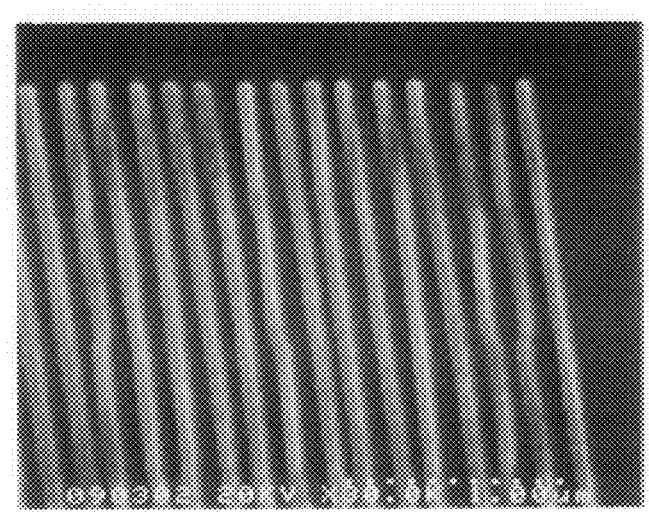
FIG. 3 is a diagram for an actually designed focusing grating coupler according to an embodiment of the present invention, a part of which fabricated by applying the ultra fine fabrication technology is observed with a scanning electron microscope.

FIG. 3 is a diagram for a focusing grating coupler actually designed according to an embodiment of the present invention, a part of which fabricated by applying the ultra fine fabrication technology is observed with a scanning electron microscope. Here, it was shown that the minimum line width is 85 nm, the numerical aperture NA is 0.85, the size of the focusing grating coupler is 1 mm×1 mm, and the focal length is 310 μm. Considering other measures for the actually fabricated focusing grating coupler, the cladding layer with a refractive index of about 1.4714 had a thickness of about 5.09 μm and the core layer with a refractive index of about 1.4784 had a thickness of about 2.01 μm. For fine fabrication of 85 nm, the e-beam lithography for the semiconductor process was applied.

Figure 4A:
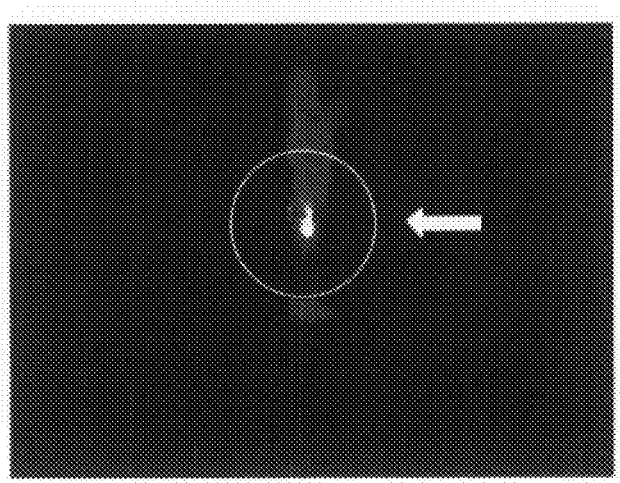
FIG. 4A is a diagram showing an actually measured result of a spot size for the focusing grating coupler according to the fabrication example of FIG. 3.
Figure 4B:
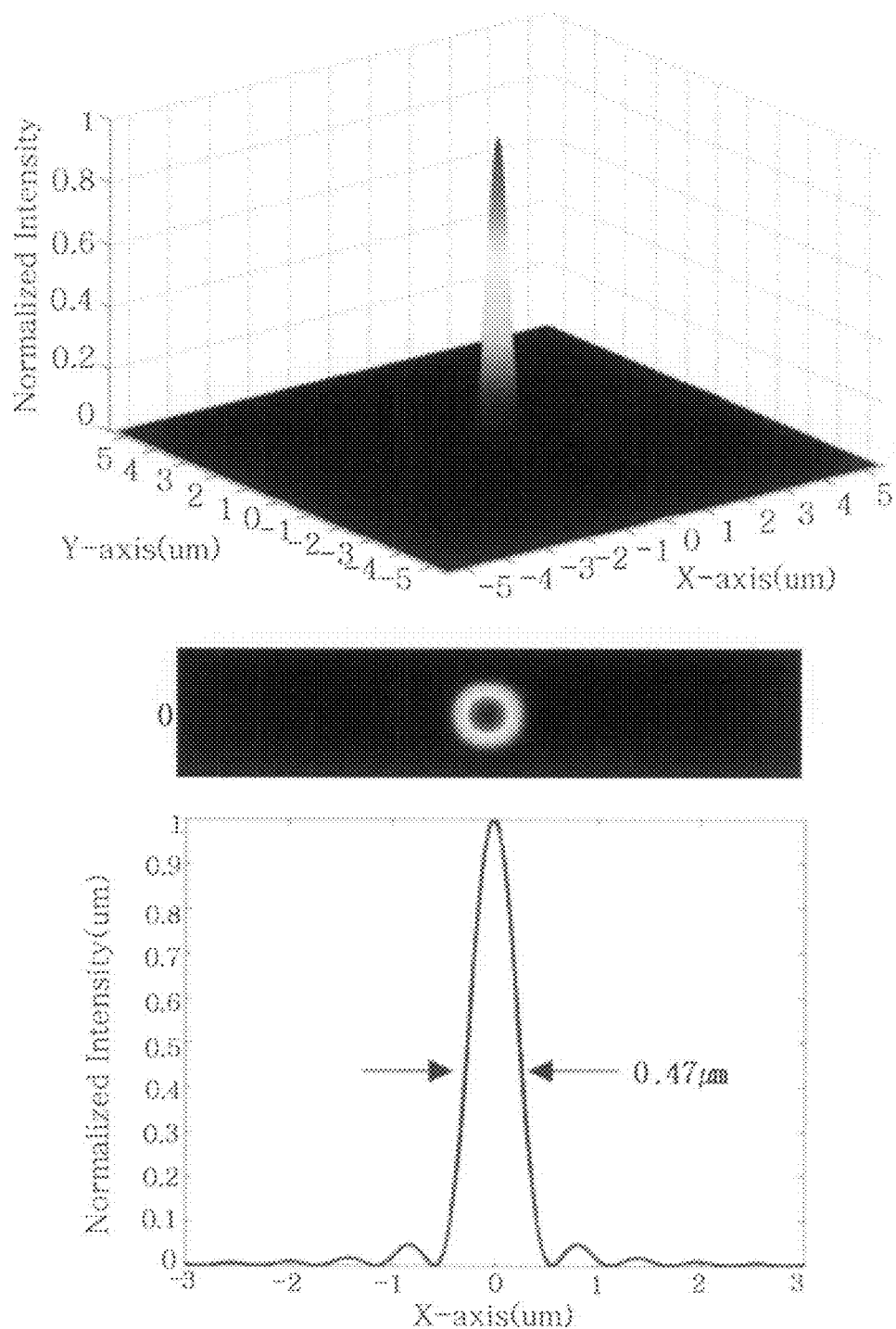
FIG. 4B is a diagram showing a calculation value through a computer copy for a spot size of the focusing grating coupler.

Meanwhile, FIG. 4A is a diagram showing an actually measured result of a spot size for the focusing grating coupler according to the fabrication example of FIG. 3, and FIG. 4B is a diagram showing a calculation value through a computer simulation for a spot size of the focusing grating coupler. Here, the expected spot size and shape are shown in two dimensions and in three dimensions, in the context that the design and the process are performed ideally. In this embodiment, the radius of spot size was measured to be 470 nm.

Consequently, although the present invention has been specifically described with reference to the preferred embodiments, it should be noted that these embodiments are just illustrative, but not restrictive. Further, those skilled in the art will appreciate that a variety of embodiments can be made without departing from the scope of the present invention.

According to the present invention, a focusing grating coupler for a short wavelength laser that can be employed instead of the substance lens can be fabricated to obtain a high-density information storage as an integral parts used in the ultra small type optical disk pickup module.

Further, the ultra small, ultra lightweight mobile/portable optical disk mass storage can be obtained. More than 2 pieces of high quality movies can be stored into a coin-sized disk, and various functions such as video mail transfer, a response and a high quality image recording, a 3D game or a large-sized software execution can be performed mounted on a mobile phone or a digital camera.

Therefore, it is advantageous that an ultra small type pickup head for a mobile optical disk can be applied by fabricating a fine focusing grating coupler to significantly reduce a volume and a weight.

What is claimed is:

1. A planar focusing grating coupler comprising:
a light waveguide including a cladding layer and a core layer formed on a substrate and maintaining incident laser light in a single mode, wherein the cladding layer is a silicon oxide layer and the core layer is a boron-silicate glass layer; and
a focusing grating coupler formed to have a predetermined grating pitch at a certain area over the core layer, wherein the light incident into the light waveguide forms a focal point using the grating layer in a direction perpendicular to the focusing grating coupler, and wherein the grating pitch is 350 to 50 nm.

2. The planar focusing grating coupler according to claim 1, wherein a vertical direction of the focusing grating coupler is an upper portion of a center point of the certain area of the focusing grating coupler.

3. The planar focusing grating coupler according to claim 1, wherein a difference of refractive indexes of the cladding layer and the core layer is within 0.2%.

4. The planar focusing grating coupler according to claim 1, wherein the planar focusing grating coupler is applied to the light whose wavelength is below 400 nm.

5. The planar focusing grating coupler according to claim 1, wherein the space of the grating layer uses a phase match diagram to change each grating pitch so that a coupling angle for each grating can face the focusing grating coupler lens center.

6. The planar focusing grating coupler according to claim 1, wherein, as a change ratio of the grating pitch, a numerical aperture is determined with a minimum coupling angle and a maximum coupling angle, and the numerical aperture is above 0.6.

7. The planar focusing grating coupler according to claim 1, wherein the gratings are formed at the position (x,y) that meets the following equation at the integer multiples of a wavelength $$\Delta = \left[ N_{eff} \sqrt{x^2 + (y+r)^2} + \sqrt{x^2 + y^2 + f^2} - N_{eff} r - f \right] \quad (3)$$
$$= m\lambda (m = 0, \pm 1, \pm 2 \ldots)$$

($N_{eff}$ is an effective refractive index of a light waveguide layer, r is a distance between an origin of a laser diode and a center of a focusing grating coupler, and f is a focal length).

8. A planar focusing grating coupler comprising:
a light waveguide including a cladding layer and a core layer formed on a substrate and maintaining incident laser light in a single mode; and
a focusing grating coupler formed to have a predetermined grating pitch at a certain area over the core layer, wherein the light incident into the light waveguide forms a focal point using the grating layer in a direction perpendicular to the focusing grating coupler, and wherein the gratings are formed at the position (x,y) that meets the following equation at the integer multiples of a wavelength $$\Delta = \left[ N_{eff} \sqrt{x^2 + (y+r)^2} + \sqrt{x^2 + y^2 + f^2} - N_{eff} r - f \right] \quad (3)$$
$$= m\lambda (m = 0, \pm 1, \pm 2 \ldots)$$

($N_{eff}$ is an effective refractive index of a light waveguide layer, r is a distance between an origin of a laser diode and a center of a focusing grating coupler, and f is a focal length).

9. The planar focusing grating coupler according to claim 7, wherein a vertical direction of the focusing grating coupler is a upper portion of a center point of the certain area of the focusing grating coupler.

10. The planar focusing grating coupler according to claim 7, wherein a difference of refractive indexes of the cladding layer and the core layer is within 0.2%.

11. The planar focusing grating coupler according to claim 7, wherein the planar focusing grating coupler is applied to the light whose wavelength is below 400 nm.

12. The planar focusing grating coupler according to claim 7, wherein the space of the grating layer uses a phase match diagram to change each grating pitch so that a coupling angle for each grating can face a lens center.

13. The planar focusing grating coupler according to claim 7, wherein, as a change ratio of the grating pitch, a numerical aperture is determined with a minimum coupling angle and a maximum coupling angle, and the numerical aperture is above 0.6.

14. A planar focusing grating coupler comprising:
a light waveguide including a cladding layer and a core layer formed on a substrate and maintaining incident laser light in a single mode; and a focusing grating coupler formed to have a predetermined grating pitch at a certain area over the core layer, wherein the focusing grating coupler is a patterned silicon nitride layer, wherein the light incident into the light waveguide forms a focal point using the grating layer in a direction perpendicular to the focusing grating coupler, and wherein the grating pitch is 350 to 50 nm.

15. The planar focusing grating coupler according to claim 14, wherein the vertical direction of the focusing grating coupler is an upper portion of a center point of the certain area of the focusing grating coupler.

16. The planar focusing grating coupler according to claim 14, wherein a difference of refractive indexes of the cladding layer and the core layer is within 0.2%.

17. The planar focusing grating coupler according to claim 14, wherein the planar focusing grating coupler is applied to the light whose wavelength is below 400 nm.

18. The planar focusing grating coupler according to claim 14, wherein the space of the grating layer uses a phase match diagram to change each grating pitch so that a coupling angle for each grating can face the focusing grating coupler lens center.

19. The planar focusing grating coupler according to claim 14, wherein, as a change ratio of the grating pitch, a numerical aperture is determined with a minimum coupling angle and a maximum coupling angle, and the numerical aperture is above 0.6.

20. The planar focusing grating coupler according to claim 14, wherein the gratings are formed at the position (x,y) that meets the following equation at the integer multiples of a wavelength $$\Delta = \left[ N_{eff} \sqrt{x^2 + (y+r)^2} + \sqrt{x^2 + y^2 + f^2} - N_{eff} r - f \right] \quad (3)$$
$$= m\lambda (m = 0, \pm 1, \pm 2 \ldots)$$

(Neff is an effective refractive index of a light waveguide layer, r is a distance between an origin of a laser diode and a center of a focusing grating coupler, and f is a focal length).

* * * * *